May 8, 1923. 1,454,833
L. A. DARLING
ELECTRICAL MACHINE
Filed April 30, 1919  2 Sheets-Sheet 1
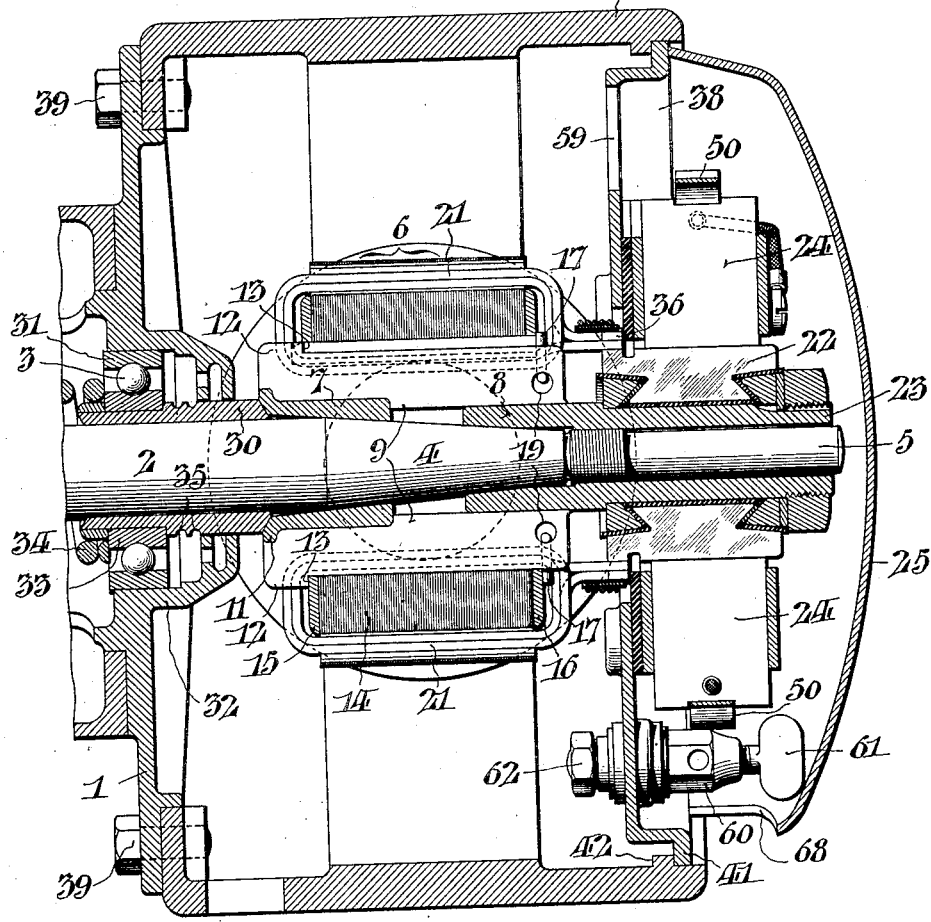
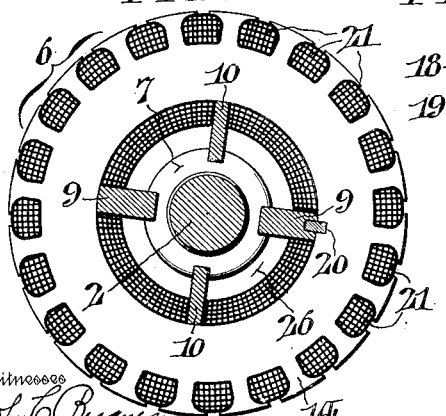
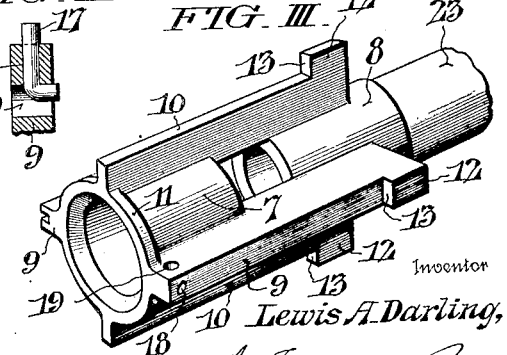
Inventor
Lewis A. Darling,
Attorney May 8, 1923.
L. A. DARLING
ELECTRICAL MACHINE
Filed April 30, 1919
1,454,833
2 Sheets-Sheet 2
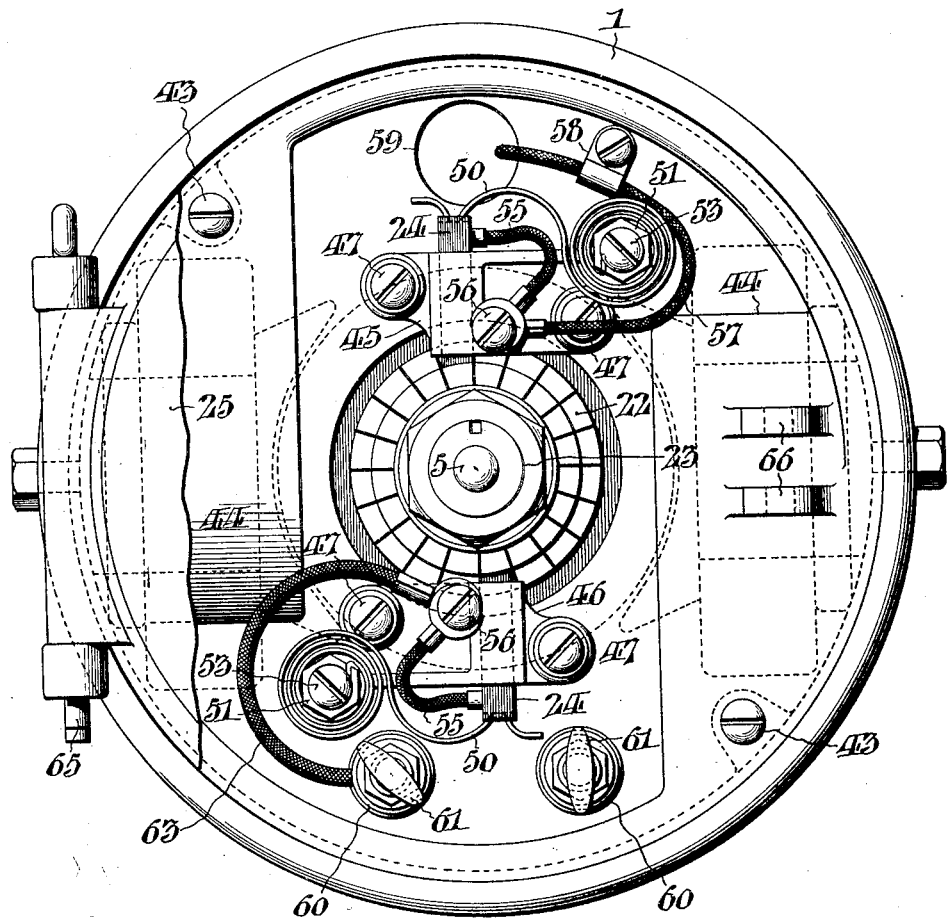
FIG. V.
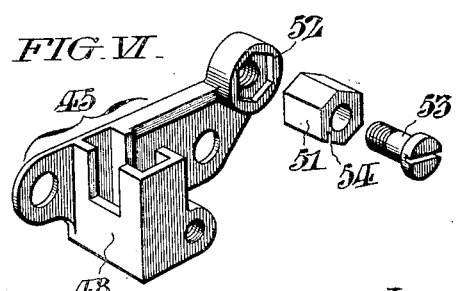
FIG. VI.
Witnesses:
John C. Bergner
James H. Bell
Inventor:
Lewis A. Darling,
By Raley & Paul
Attorneys Patented May 8, 1923.

1,454,833

UNITED STATES PATENT OFFICE.

LEWIS A. DARLING, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA.

ELECTRICAL MACHINE.

Application filed April 30, 1919. Serial No. 293,763.

*To all whom it may concern:*

Be it known that I, LEWIS A. DARLING, a citizen of the United States, residing in the city and county of Philadelphia and State of Pennsylvania, have invented certain new and useful Improvements in Electrical Machines, whereof the following is a specification, reference being had to the accompanying drawings.

My invention relates to electrical machines (such as motors and generators) and their accessory parts, and especially to the armature and shaft mounting of such machines. It is my aim to provide for effective ventilation of the armature by passage or circulation of air therethrough; to mount the armature on the shaft in a manner at once stable, secure, and admitting of its easy removal upon occasion; to mount the shaft itself in its bearings in such wise as to permit both its own removal and that of the armature with minimum disturbance of the other parts of the machine; and to facilitate, in various ways, the taking apart and adjustment of the machine and its parts and ready access thereto. I also aim to secure ruggedness, durability, simplicity of construction, and ease and cheapness of manufacture. How the foregoing and other advantages can be realized in connection with my invention will appear from the description hereinafter of the best form of embodiment at present known to me, while its scope and essentials will be indicated in my claims.

The invention is of especial advantage under the severe operating conditions of power generator sets for supplying electric current to steam locomotive headlights, both in respect to the vibration and swaying of the locomotive, and by reason of their being (usually) mounted on top of the locomotive boiler, exposed to sulphurous gases and to cinder-laden smoke. Most of the features mentioned above are, it will be seen, of special importance in such sets, in view of the heat and general inconvenience under which repair operations on them must often be carried out.

In the drawings, Fig. I, shows a mid-sectional view through a generator constructed in accordance with my invention, and especially adapted for a locomotive headlight steam turbo-generator set.

Fig. II, shows a cross-section of the armature at about its middle, as seen from the right of Fig. I.

Fig. III, is a perspective view of a spider member of the armature whereby it is mounted on its shaft, slightly modified as compared with Fig. I.

Fig. IV, shows an enlarged cross-section through one end of a space-bar forming part of the spider, illustrating the attachment thereto of securing means for retaining the armature in proper position on the spider.

Fig. V is an end-wise view of the generator, from the left of Fig. I, the greater part of the cover shown in cross section in Fig. I being broken away and removed.

Fig. VI is an enlarged perspective view of a brush holder and accessory parts shown in Figs. I and V.

As shown in Fig. I, the generator casing 1, is attached at one end to the frame or casing of the steam turbine or the like whereby the generator is driven. The main shaft 2, of the generator set extends into the generator through a journal bearing 3, of ball type, and has a tapered section 4, and therebeyond (and distinct therefrom) a reduced section 5, screw-threaded immediately adjacent the tapered section. At this portion of the shaft 2, is located the armature proper 6, comprising the core, coils, and associated electrical parts.

As will be seen from Figs. I, II, and III, the armature 6, is mounted on the shaft 2, by means of a spider member internally tapered to fit upon the tapered shaft section 4, and internally screw-threaded to screw (freely or even a little loosely) upon the threaded shaft section 5. This threading of the armature spider member upon the shaft 2, facilitates its engagement on the taper section squarely and with just the desired tightness of fit to make it stable and secure, and also aids greatly in the initial "breaking" of the hold of the armature 6, on the shaft when it is to be removed. The location of the threads immediately or closely adjacent the tapered shaft section 4, avoids risk of springing of the reduced shaft section 5, in mounting the armature on the shaft. The hub means of the spider member, it will be seen, is adapted to fit upon and engage the tapered shaft 2, only at zones substantially separated lengthwise thereof,—the hub means here shown comprising entirely separate hub portions 7 and 8, that are connected together only by the attached spider bars 9 and 10, which extend lengthwise of the shaft and on which the armature core is mounted. The engagement of the spider on the shaft 2, only at substantially separated points or zones allows the armature 6, to be properly aligned and made perfectly rigid and stable on the shaft (as against rocking or wobbling, etc.) without the utmost refinement of workmanship and finish. For purposes to be hereinafter explained, the hub portions 7, has at its outer edge a flange 11, with an accurately beveled surface.

Still referring to Figs. I, II, and III, it will be seen that the bars 9 and 10, are arranged in radial planes about the shaft 2, and that each of these bars has at one end (the left-hand end in Fig. I, and the right-hand or commutator end in Fig. III) a lug 12, which affords an abutment shoulder 13, for determining the position of the laminated armature core 14, with its end plates 15 and 16, etc., lengthwise of the spider member. After being thus placed on the spider, the core 14, is retained in proper position by securing means shown as having the form of pins 17, (see also Fig. IV) attached to the bars 9, 9, by being inserted in radial holes 18, therein, and bent sidewise in transverse holes 19, that intersect said holes 18. The bars 9, 9, it will be seen, are made somewhat thicker than the bars 10, 10, in order to afford space for the holes 18; and this extra thickness also allows the edgewise or radial grooving of one of them to accommodate a key 20, (see Fig. II) that engages in notches in the core laminations and so secures the core, etc., against angular displacement. As shown, the bars 9 and 10, are in opposed pairs arranged quadrant-wise and all provided with shoulders 13; but it will be understood that there may be considerable variation as regards number of bars and other particulars.

Referring, now, to Figs. I and II, it will be seen that the bars 9 and 10, are of such radial width and of such substantially greater spread diametrically as compared with the shaft 2, and the hub means 7, 8, as to afford substantial ventilating space within the armature 6, so as to permit free passage of air therethrough around the shaft. The particular armature shown is ring-wound, and in order to permit free passage of air through the ventilating space afforded by the intervals between the bars 9 and 10, the portions of the armature coils 21 which lie in these intervals have a dimension radially of the armature materially less than the effective width of said bars outside of the hub portions 7, 8.

From Figs. I and III, it will be seen that the hub portion 8, has an extension 23, to the right of the spider proper that carries the usual commutator 22, on which wipe the brushes 24, 24,—all these parts being enclosed by a removable cover 25, on this end of the generator casing. The shaft section 5, it will be seen, protrudes a little outside of the hub extension-sleeve 23, for convenience in the use of a tachometer; but beyond its threaded portion this shaft section 5, is loose in the sleeve 23, and without function in the structure and normal operation of the apparatus. The commutator 22, it will be seen, is overhung with reference to the bearing 3, which is the outermost at the commutator end of the shaft 2.

Referring, now, to Fig. I, it will be seen that the beveled flange 11, on the hub portion 7, of the spider member provides the shaft 2 with a shoulder at one end of the armature 6, for receiving the axial thrust of a shouldered sleeve 30, mounted on the shaft and free to move lengthwise thereof. The journal bearing 3, it will be seen, comprises a stationary element 31, free to move axially in a bearing housing 32, in the motor casing 1, and a rotating element 33, mounted on the sleeve 30, and yieldingly urged against its shoulder by means of the helical compression spring 34,—which latter also urges said sleeve against the axial thrust shoulder 11, of the shaft 2. Thus the ball journal bearing 3, is kept in proper position with the necessary freedom for self-adjustment. Grooves 35, in the sleeve 30, serve to distribute and circulate back through the bearing 3, any oil that enters this end of the housing 32, and the accurately beveled engaging surfaces at 11, prevent oil that works its way along the shaft 2, inside the sleeve 30, from reaching the armature 6. A measure of protection to the armature against oil outside the sleeve 30, is afforded by the outer portion of the flange 11. The "shell" portion of the generator casing is secured to the back or end plate containing the bearing housing 32, by bolts 39.

It will be seen that the brushes 24, and generator terminals 60, are carried and readily accessible on the outer side of the supporting structure 38, which is detachably secured across the commutator end of the casing 1, at the inner end of the commutator, and is here shown as having the form of an irregularly dished diaphragm plate with a peripheral flange 41, seated against a corresponding shoulder 42, on the generator casing 1, and detachably secured (see Fig. V) by means of a couple of screws 43. that take into lugs on the casing 1. This diaphragm 38, has outward extending recess portions 44, that accommodate the poles and field coils of the generator. As shown, the shaft 2, has no outboard bearing, so that the commutator 22, is overhung with respect to the bearing 3, which is thus (as already mentioned) the outermost bearing at this end of the shaft.

The brush holders 45, 46, on the outer side of the diaphragm 38, are insulatively mounted, and are each firmly and rigidly secured to the diaphragm by two screws 47, extending through holes in the main brush-holder members. As shown, each brush holder is insulated from the diaphragm 38, by means of an interposed plate of insulating fibre of the same shape as the brush holder, and by insulating sleeves in the brush holder holes and insulating washers under the heads of the screws 47. These brush holders 45, 46, being just alike, the description of the holder 45, will suffice.

The main member of the brush holder 45, (see Figs. V and VI) has guiding means 48, for the longitudinally sliding rectangular carbon brush 24, and the brush 24, is urged endwise against the commutator 22, by a coiled flat spring 50, that acts cantilever-wise on the outer end of the brush. At the center of the spring 50, is a polygonal holding part 51. The main holder member and the part 51, have correlative anti-turning engagement means here shown as consisting of the hexagonally polygonal end of the part 51, and a corresponding polygonal socket 52, in said main holder member 45, and the part 51, is secured to the main holder member by a screw 53, with its end engaged in the socket 52. The inside or fixed end of the spring 50, being engaged in a notch 54, in the part 51, the tension of the spring and its pressure on the brush 24, can be adjusted by merely backing out the screw 53, sufficiently to permit the engagement means at 52, to be released so that the part 51, may be turned 60° or a multiple angle. The brush 24, it will be seen, is positively connected to the main brush holder member 45, by a flexible lead 55, on the brush and a binding screw 56, taking into the member 45. The flexible field lead 57, of the brush 24, is also fastened to the binding screw 56, being held in proper position by a screw-fastened clip 58, and penetrating the diaphragm 38, through the ventilating opening 59, near its upper edge.

Near the lower edge of the diaphragm 38, are mounted on the outer side thereof the main generator terminals 60, 60, with their binding means 61,—these terminals having connecting means 62, at the inner side of the diaphragm. The brush holder 46, is connected to one of these terminals by the flexible lead 63.

It will be seen that the diaphragm form of the supporting structure 38, substantially closes off or occludes this end of the motor casing 1, and effectually prevents entrance of large cinders into the generator. Provision for enclosing and protecting the parts on the outer side of the diaphragm 38, is made by means of the cover 25, that practically closes this whole end of the generator casing 1; this cover 25, is pivotally mounted on the casing 1, at 65, independently of the diaphragm 38, so as to be readily swung open to a position where it will expose said parts and not interfere with removal of said diaphragm, and it is normally held closed through the instrumentality of engagement means 66, on the diaphragm. This cover 25, affords the parts inside it good protection, since its principal opening is that at its bottom at 68, which permits ventilation and accommodates the main generator leads from the terminals 60, 60.

Opening of the door-like cover 25, at once renders the brushes 24, and terminals 60, readily accessible on the outer side of the structure 38. When access to the armature 6, is desired, the brushes 24, are freely removable for this purpose along with the readily removable structure 38, upon the mere detachment of the latter from the casing 1, by the removal of its two screws 43,—the various current leads being made of just sufficient length to permit said structure 38, to be lowered out of the way without detachment of any of them. To facilitate removal and replacement of the diaphragm 38, with the brushes 24, etc., it is advisable to disengage the tension springs 50, 50, from the outer ends of the brushes (without detachment), after which the free spring ends may rest on the edges of the guide means 48, 48, where they will press laterally against the brushes just enough to keep the brushes from slipping inward in the guide means. The brushes 24, and structure 38, having been thus removed, it is an easy matter to loosen and disengage the armature 6, from the shaft 2, by simply turning it after blocking the shaft at its other end; and when thus disengaged, the armature is at once freely removable. If it is desired to remove the brushes 24, and diaphragm 38, altogether,—either when removing the armature 6, or without disturbing the armature,—it is only necessary to detach it as above set forth and disconnect the necessary current leads.

If it be desired to take down the whole generator shell and fields, this can be done very expeditiously by merely opening the door 25, and relaxing the tension on the springs 50, 50, as above set forth, and then closing said door and removing the bolts 39, 39,—without removing the armature 6, from the shaft 2, unless it is desired to do so. If the armature 6, is removed in taking down the generator shell etc., it is preferable to put back the diaphragm plate 38, and close the door 25, before taking out the bolts 39.

Certain features of the construction herein shown, involving the removable diaphragm 38 and the cover 25, are not here claimed, for the reason that they form the subject-matter of my application, Serial No. 293,764, filed concurrently with this application.

Having thus described my invention, I claim:

1. An armature mounting comprising a shaft with a tapered section and a screw-threaded section distinct therefrom, and an armature member including a winding internally tapered to fit upon the tapered shaft section and a relatively fixed commutator screw-threaded to screw upon the threaded section.

2. In an electric machine, a shaft having end portions of different diameters and an intermediate tapering portion, the shaft portion of smaller diameter being threaded at a point adjacent the tapering portion, an armature comprising a pair of hub members, one embracing the wider end of the tapering portion of the shaft and the other embracing the smaller end of the tapering portion and extending along the shaft portion of smaller diameter and internally threaded to engage the threaded portion of the shaft, a commutator carried by the smaller hub member and an armature winding carried upon and between said hub members.

3. In an electric machine a shaft having end portions of different diameters and an intermediate tapering portion, an armature mounted on the shaft and having a tapering opening receiving the tapering portion of the shaft, a threaded connection between the armature mounting and the shaft, a sleeve embracing the wider end of the shaft and engaging the armature, a bearing member embracing the sleeve affording a support for the shaft, and a resilient means engaging the bearing member whereby to disengage the armature mounting from the tapered portion of the shaft after the armature has been rotated relative to the shaft to an amount sufficient to disengage their threaded portions so that the armature mounted may be readily withdrawn from the shaft.

4. In an electric machine a shaft having end portions of different diameters and an intermediate tapering portion, the end of smaller diameter being threaded for a relatively short distance at a point adjacent the tapering portion, an armature mounting comprising a hub member embracing the wider end of the tapering portion, a second hub member having one end embracing the smaller end of the tapering portion and extending along and inclosing the smaller end of the shaft, fins formed integrally with the hub members connecting the same and extending radially therefrom, an armature cage slidable endwise over said fins and inclosing the same, a commutator mounted upon the end of the second hub member, the latter having a shoulder against which, the commutator abuts, and an exterior threaded end, and a nut applied to said threaded end and engaging the commutator to secure the latter in place.

In witness whereof, I have hereunto signed my name at Philadelphia, Pennsylvania, this 25th day of April, 1919.

LEWIS A. DARLING.

Witnesses:
JAMES H. BELL,
E. L. FULLERTON.